(12) United States Patent
Bernstein

(10) Patent No.: US 6,697,358 B2
(45) Date of Patent: Feb. 24, 2004

(54) EMULATION OF PHONE EXTENSIONS IN A PACKET TELEPHONY DISTRIBUTION SYSTEM

(75) Inventor: Jeffrey G. Bernstein, Middleton, MA (US)

(73) Assignee: 2Wire, Inc., San Jose, CA (US)

( * ) Notice: Subject to any disclaimer, the term of this patent is extended or adjusted under 35 U.S.C. 154(b) by 0 days.

(21) Appl. No.: 10/199,871

(22) Filed: Jul. 18, 2002

(65) Prior Publication Data

US 2003/0026247 A1 Feb. 6, 2003

Related U.S. Application Data

(60) Provisional application No. 60/306,473, filed on Jul. 18, 2001, and provisional application No. 60/306,474, filed on Jul. 18, 2001.

(51) Int. Cl.[7] ........................ H04L 12/66; H04M 13/00
(52) U.S. Cl. ........................ 370/352; 370/355; 370/356; 379/177; 379/156; 379/88.17
(58) Field of Search .................. 379/177, 179, 379/161, 168, 156, 372, 373.01, 88.17; 370/352, 355, 356, 357, 389; 455/422, 554, 555, 74.1, 422.1, 462

(56) References Cited

U.S. PATENT DOCUMENTS

| | | | |
|---|---|---|---|
| 4,821,319 A | | 4/1989 | Middleton et al. |
| 5,117,451 A | | 5/1992 | Ladd et al. |
| 5,283,825 A | | 2/1994 | Druckman et al. |
| 5,623,537 A | * | 4/1997 | Ensor et al. ................ 379/88.2 |
| 5,903,572 A | * | 5/1999 | Wright et al. ................ 370/524 |
| 6,061,438 A | * | 5/2000 | Shen et al. .................. 379/161 |
| 6,167,043 A | * | 12/2000 | Frantz ......................... 370/356 |
| 6,215,799 B1 | * | 4/2001 | Mitchell et al. ............. 370/524 |
| 6,230,130 B1 | * | 5/2001 | Castello da Costa et al. ................. 704/258 |
| 6,263,061 B1 | * | 7/2001 | Tanaka et al. .............. 379/156 |
| 6,310,940 B1 | | 10/2001 | Ratz |
| 6,345,047 B1 | | 2/2002 | Regnier |
| 6,526,581 B1 | * | 2/2003 | Edson ......................... 725/74 |

FOREIGN PATENT DOCUMENTS

WO   PCT US02/23111   12/2002

* cited by examiner

*Primary Examiner*—Sonny Trinh
(74) *Attorney, Agent, or Firm*—Blakely, Sokoloff, Taylor & Zafman LLP

(57) ABSTRACT

A system and method for emulating phone extensions in a packet telephony distribution system include using a gateway and an adapter. Signaling protocols between the gateway and the adapter provide procedures to enable typical analog phone system characteristics such as a dial tone and a line-in-use indicator. During an incoming or outgoing call, users of multiple phones on the packet telephony distribution system can make and receive calls or join a call in progress using methodologies commonly used for typical analog phone systems.

19 Claims, 7 Drawing Sheets

| PHONE NAME | ADDRESS | CALLER ID | TOD | DOW | ... |
|---|---|---|---|---|---|
| 530 | 540 | 550 | 560 | 570 | 580 |
| | | | | | |
| | | | | | |
| | | | | | |
| | | | | | |
| ⋮ | ⋮ | ⋮ | ⋮ | ⋮ | ⋮ |

EMULATION OF PHONE EXTENSIONS IN A PACKET TELEPHONY DISTRIBUTION SYSTEM

CROSS-REFERENCE TO RELATED APPLICATIONS

This application is related to, and claims the benefit of, U.S. Provisional Patent Application No. 60/306,473, entitled "Emulation of Phone Extensions in a Packet Telephony Distribution System," filed Jul. 18, 2001, and U.S. Provisional Patent Application No. 60/306,474, entitled "Dual-Use Packet/Analog Phone or Phone-Adapter in a Packet Telephony Distribution System," filed Jul. 18, 2001. The subject matter of the related applications is hereby incorporated by reference.

BACKGROUND OF THE INVENTION

1. Field of the Invention

This invention relates generally to emulating the operation of phone extensions for analog and digital communication in a packet telephony distribution system.

2. Description of the Background Art

Typical telephone (phone) wiring in a home or business supports the use of one or two independent phone lines. Some premises support more phone lines. To provide access to phone lines, typically, several phone line jacks are connected to phone lines throughout the home. Sometimes, each phone line jack may be connected to all of the available phone lines, which permits the use of multi-line phones. Alternatively, each phone line jack may be connected to only one phone line.

When a home has an insufficient number of phone lines, a homeowner can order additional phone lines from a service provider. If the in-home wiring to support the new phone lines is already wired to the appropriate room or rooms, then there is no required change to the in-home wiring to support the new phone lines. However, if there are more desired phone lines than the existing in-home wiring can support, or if a phone jack is not connected to the desired phone line, then changes must be made to the in-home wiring. Such in-home wiring changes, particularly those that involve running new wires through the walls of a home, typically require a skilled phone technician at a relatively significant expense to the homeowner. The expense associated with providing new in-home wiring must be reduced to make the addition of new phone lines economical.

While it is currently uncommon for a household to have more phone lines than can be supported by existing in-home wiring, recent technological advances permit service providers, such as phone companies, cable TV companies, and other competing organizations, to offer additional phone lines at a relatively low cost. These technological advances permit these companies to make use of existing in-home wires to carry more than one phone signal at a time and are commonly called "derived" phone lines. Derived phone lines make it significantly easier and less expensive to provide additional phone service.

One approach to avoid running new inside wiring when the number of phone lines required exceeds the capacity of the existing wiring and permitting a single in-home copper wire-pair to support more than one phone line, is via data networking technology. Packet data networks, such as Ethernet, are commonly used to share high-speed data information around a home. Packet data networks permit multiple devices to send and receive data on the same physical network by dividing data into discrete packets, and providing a means for the devices to negotiate which device may send data at a given time. While Ethernet networks require special wiring that few homes have installed, such as Cat5 (Category 5) copper cable, recent technological advances permit high-speed packet data networks to operate on existing in-home wires. Alternatively, a wireless high-speed packet data network obviates the need for in-home wiring.

An example of a new technology is phoneline networking, which permits packet data networking over a single wire-pair of existing in-home wiring. An industry standard for phone line networking is HomePNA (Home Phoneline Networking Alliance). HomePNA ensures that signals sharing a phone line with the POTS (Plain Old Telephone Service) line coexist and maximize throughput despite signaling constraints, such as attenuation and noise.

Another technology is powerline networking, which permits packet data networking over AC power lines in the home. An industry standard for powerline networking is HomePlug (HomePlug Powerline Alliance). HomePlug permits power outlets to provide a power source and also provide network ports for packet data networking. Since multiple power outlets are more common in a home than multiple phone line jacks, there is typically no need to install new in-home wiring.

Finally, wireless networking technology permits packet data networking with no wires at all and operates over distances that span the full length and breadth of most homes. Industry standards for wireless networking include IEEE 802.11 and HomeRF (Home Radio Frequency).

Technology also exists to permit a packet data network to carry phone signals. Such technologies include packet telephony protocols for transmitting and receiving digitized voice signals in addition to call-control signaling. One technology is Voice Over IP (Internet Protocol) or VoIP. A number of industry standards exist for VoIP, including ITU-T H.323, ITU-T H.248 (Megaco; Media Gateway Control Protocol), MGCP (Media Gateway Control Protocol), and SIP (Session Initiation Protocol). Other technologies exist for packet data transmission of phone signals that do not make use of the Internet Protocol, but make direct use of the underlying packet data networking mechanism.

By using packet telephony in conjunction with any of the networking technologies that operate wirelessly or use existing in-home wiring, it is possible to distribute many phone lines throughout the home without installing new wires, avoiding the associated labor and cost. While all of the phones are connected to the same physical network, each phone can virtually connect to a separate phone line.

A problem occurs when one or more derived phone lines are available through a gateway in a packet data network, but users do not view the derived phone lines as a substitute for analog phone lines. For example, some derived phone lines, such as VoIP lines, are available that provide very low cost long-distance or international calling, but do not provide the quality of an analog phone line. Thus, it is desirable that the user using a phone should be able to make and accept calls on either the analog phone lines or the VoIP lines. For outgoing calls, the user may wish to decide whether to use the analog phone lines or VoIP lines depending on the destination of the call. Alternatively, the user can consider other factors such as cost and line utilization.

Typically, when multiple phones in different parts of the home are connected to the same analog phone line, the phones behave as extensions on the analog phone line. For example, when one of the phones connected to the analog phone line is in use, the user picking up the handset of another phone on the same analog phone line would not hear the dial tone, but instead would immediately join the call already in progress. When one of the phones on the analog phone line is in use and the phone is off hook, it is useful for the user about to use another phone on the same analog phone line to know that the line is in use. Many phones include line-in-use indicators on a second or subsequent phone to inform the user that a call is in progress or that the analog phone line is available. Multi-line phones often have such line-in-use indicators to inform the user which analog phone line is not in use.

Line-in-use indicators operate by detecting a loop voltage from the connected analog phone line. When all phones connected to the analog phone line are not in use, there is little or no current flowing on the analog phone line, and the loop voltage is high. When one or more phones are off hook, the off hook phones draw current from the analog phone line, resulting in a voltage drop. Other phones connected to the same analog phone line can detect the voltage drop. Further, the presence or absence of the voltage drop permits other phones to determine whether or not the analog phone line is in use.

The characteristics associated with phone extension operation and line-in-use indicators are an important part of the typical use of phones in the home or business. Therefore, to provide the virtual equivalent of in-home phone wiring in the packet telephony distribution system, it is important to emulate these characteristics. Existing packet telephony protocols such as VoIP protocols, do not include the ability to specifically emulate these characteristics of in-home phone usage. Therefore, what is needed is a technique that permits a phone system to emulate the behavior of a typical in-home phone while connected to a packet telephony distribution system.

SUMMARY OF THE INVENTION

A system for emulating phone extensions in a packet telephony distribution system comprises a gateway coupled to a telephone network, the gateway configured to dynamically control communication between a plurality of communication devices and to a plurality of data network and analog lines in the telephone network, wherein the gateway is further configured to transmit dial tones and line-in-use indicators to the plurality of communication devices, and a plurality of adapters coupled to the plurality of communication devices, the plurality of adapters being configured to receive incoming calls via the plurality of data network and analog lines and to selectively make outgoing calls via the plurality of data network and analog lines.

A system also includes a method for emulating phone extensions in a packet telephony distribution system, comprising the steps of configuring a gateway to identify a plurality of communication devices, receiving an incoming call signal from a data network and analog line at the gateway, transmitting a dial tone to the plurality of communication devices using the gateway, and transmitting a line-in-use indicator to the plurality of communication devices using the gateway.

BRIEF DESCRIPTION OF THE DRAWINGS

FIG. 5 is a diagram illustrating one embodiment of a gateway configuration;

DETAILED DESCRIPTION OF THE INVENTION

In the preferred embodiment, communication devices such as cellular phones, facsimile machines, answering machines, or telephones (phones) are coupled to a packet data network while emulating phone extensions and providing line-in-use indicators on a packet telephony distribution system. One component used to emulate a phone extension in the packet telephony distribution system is an adapter. A phone can be coupled with the adapter to connect to the packet telephony distribution system. Another component used to emulate the phone extension is a gateway. The gateway communicates with the adapter to provide the characteristics associated with a phone extension operation and a line-in-use indicator.

Figure 1:
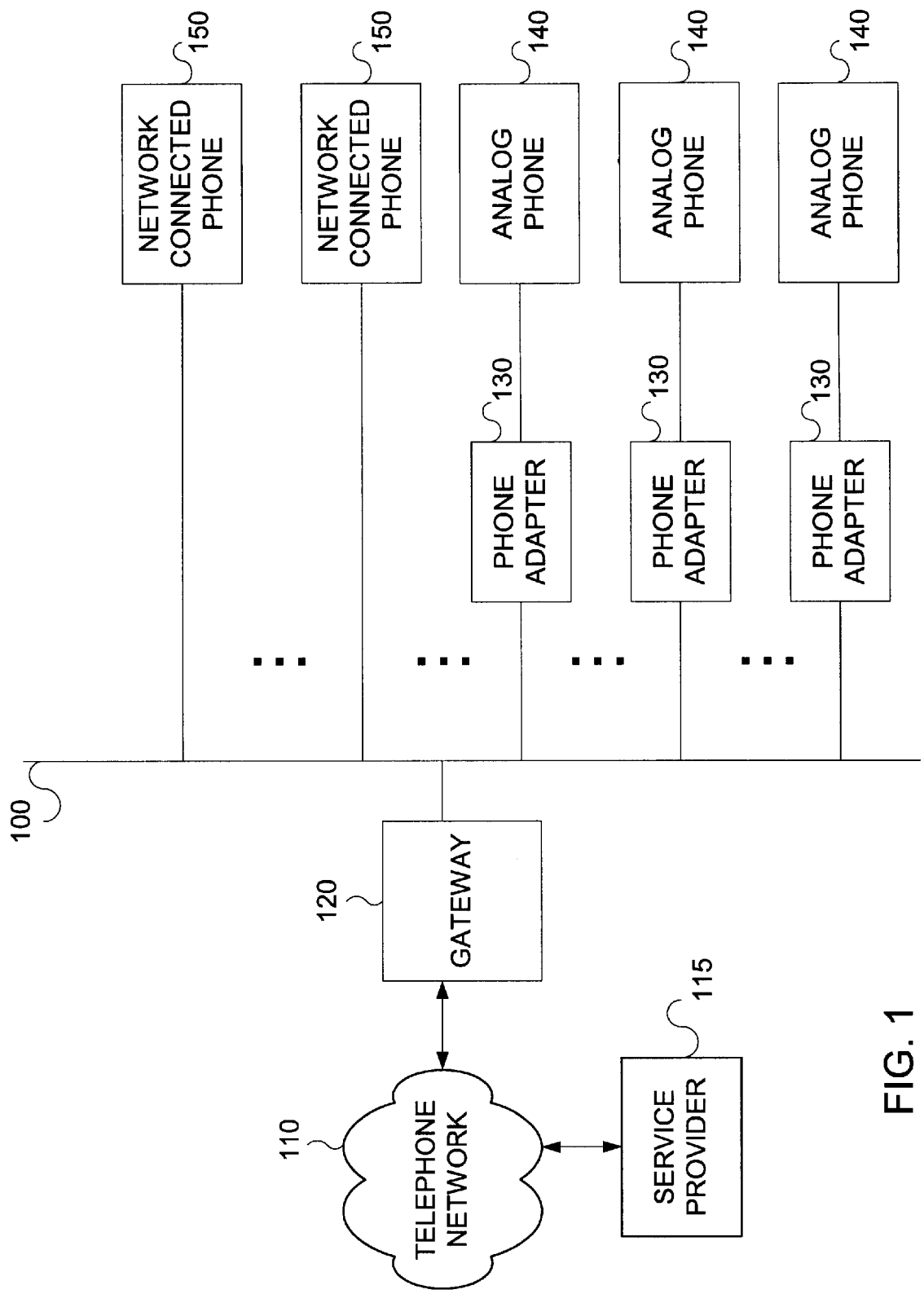
FIG. 1 is a diagram of one embodiment of a packet telephony distribution system in accordance with the invention.

FIG. 1 is a diagram of one embodiment of a packet telephony distribution system in accordance with the invention. A packet data network 100 is coupled to a telephone network 110 via at least one gateway 120. Packet data network 100 can have any network topology, such as a bus or ring, and can be wire-based or wireless. Derived phone lines and analog phone lines are available via telephone network 110, which are operated by a service provider 115, and are accessible to packet data network 100 through gateway 120. Telephone network 110 is coupled to service provider 115, which is coupled to a PSTN (Public Switched Telephone Network; not shown). PSTN includes central offices and other necessary networking equipment to provide telecommunication services. Further, service provider 115 can be a phone company, a cable TV company, or other competing organization. Gateway 120 can be any computer system or network device such as a bridge, router, or switch. Alternatively, gateway 120 can be a computer incorporating the functionality and hardware components of a network device.

Multiple analog phones 140 and network connected phones 150 are coupled to packet data network 100. Each analog phone 140 is coupled to a phone adapter 130, which provides networking and packet telephony capabilities. Network connected phones 150 include networking and packet telephony capabilities and do not require external phone adapters 130. Hereinafter, a phone refers to analog phone 140 coupled to phone adapter 130, network connected phone 150, or other communication device such as a cellular phone, facsimile machine, answering machine, or telephone.

In one embodiment, network connected phone 150 or phone adapter 130 in conjunction with analog phone 140, can be used for simultaneous calls over analog phone lines and derived phone lines, such as a packet telephony line. For example, a first user can make an outgoing call on an analog phone line. Simultaneously, a second user can receive an incoming call on a derived phone line. Further, other simultaneous incoming and outgoing calls can occur on any type of communication device connected to the packet telephony distribution system. When making or receiving calls, the call content can be voice, data, or messages via a common communication method. This embodiment also includes operations used in gateway 120 and in the communication devices, and protocols used between gateway 120 and the communication devices.

An operation performed by gateway 120 is digital mixing. Data or voice streams can originate from the communication devices or the packet telephony lines and analog lines in telephone network 110. To easily mix the streams, gateway 120 converts the stream format used by the service provider 115 to linear PCM (Pulse Code Modulation) format. Further, gateway 120 determines which streams to mix. If the stream originates from the communication devices, then gateway 120 mixes the audio from each of the communication devices for transmission to telephone network 110. For incoming streams to each communication device, gateway 120 can mix streams from telephone network 110 with streams from the communication devices in use, excluding streams for the destination communication device.

In one embodiment, mixing involves the arithmetic addition of PCM audio samples from each source of the stream. However, since PCM audio samples have an inherent numerical range limit, values in a summation may require clipping to avoid values that are too large. Clipping truncates values to the maximum positive and negative values permitted in a PCM representation. In another embodiment, gateway 120 can perform soft clipping, which is a non-linear response near the top of a range of values, to smooth the transition of a waveform that must be truncated. Further, scaling, which is a change in gain, can also be performed to reduce clipping during the mixing operation. Scaling can reduce the range of values by multiplying all values by a constant less than one.

Figure 2:
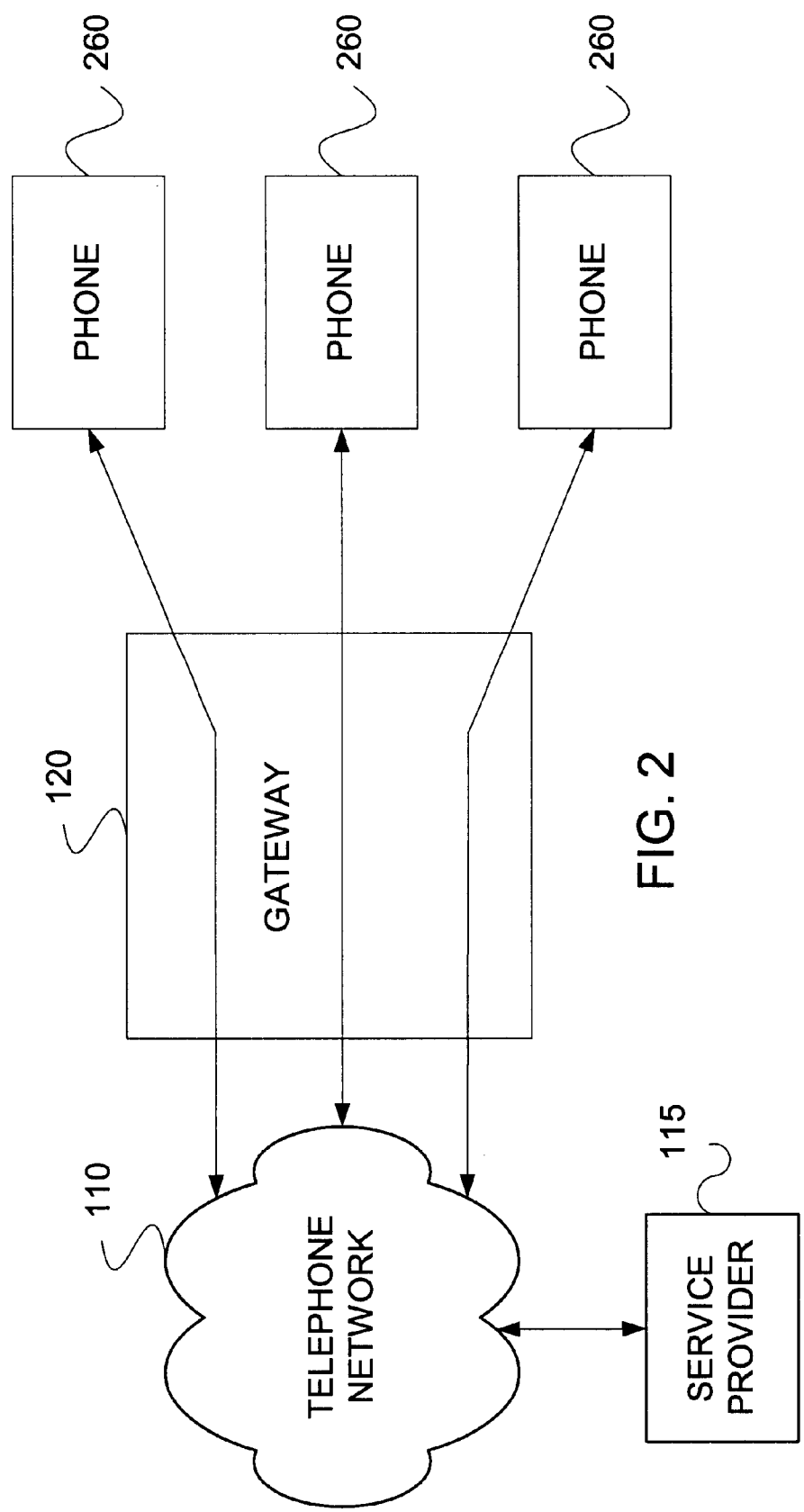
FIG. 2 is a diagram of another embodiment of a packet telephony distribution system.

FIG. 2 is a diagram of another embodiment of a packet telephony distribution system including telephone network 110 coupled to service provider 115 and further coupled to gateway 120 and phones 260. Phones 260 can either be analog phone 140 operating in conjunction with adapter 130 (FIG. 1) or network connected phone 150 (FIG. 1). Gateway 120 bridges telephone network 110 with phones 260 and provides virtual connections for voice, data, control, and signaling streams. Each phone 260 is physically coupled to packet data network 100 (FIG. 1) via wires or wireless methods. For example, multiple phones 260 can be coupled to one copper wire-pair while accessing multiple virtual connections through gateway 120.

The system shown in FIG. 2 is appropriate if each phone 260 uses the same method that service provider 115 of telephone network 110 uses to share derived phone lines to an outside phone network. For example, phones 260 and service provider 115 of telephone network 110 can both use a VoIP standard such as SIP. In this example, gateway 120 can be an IP bridge or router.

Figure 3:
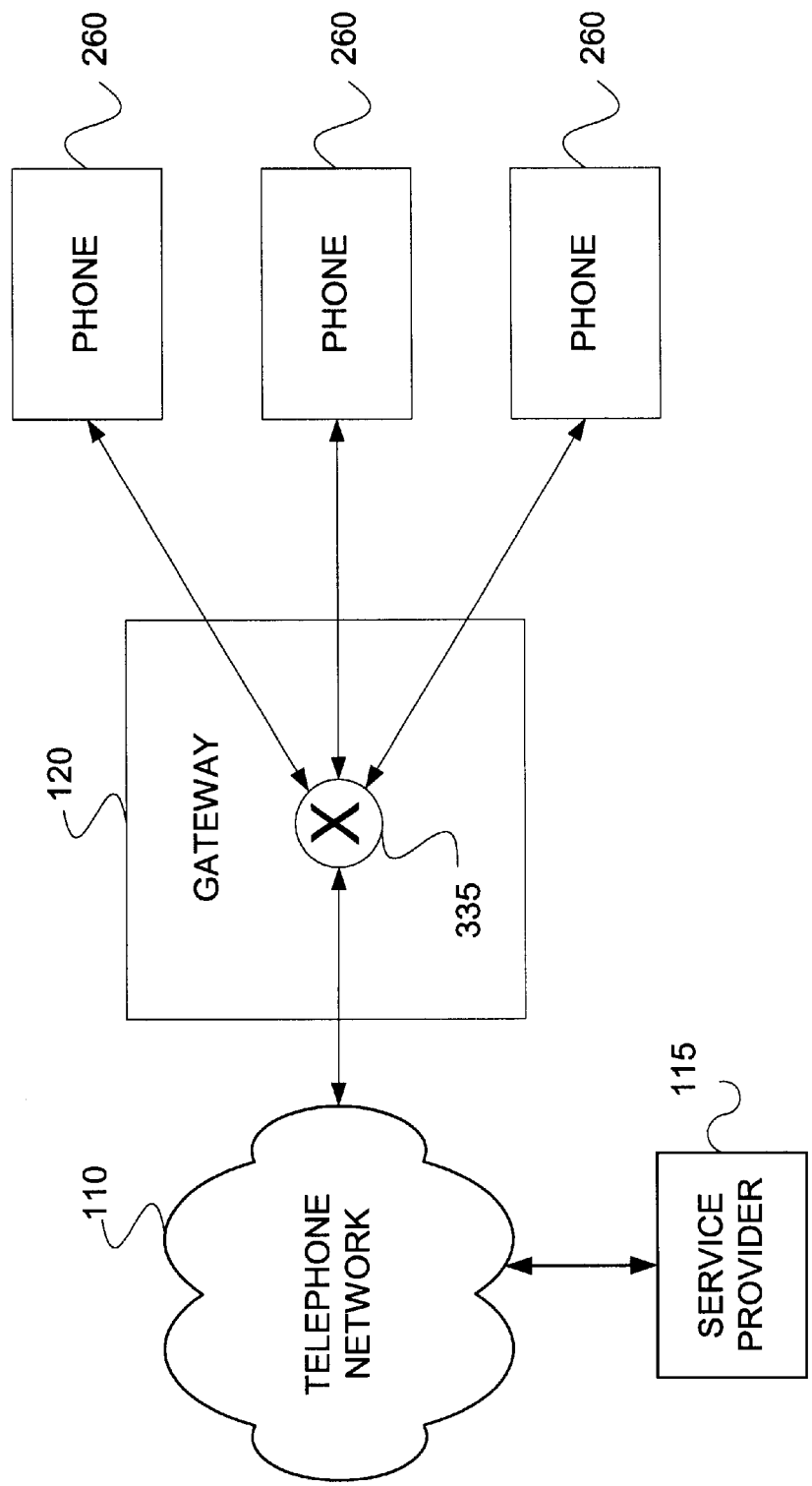
FIG. 3 is a diagram of another embodiment of a packet telephony distribution system in accordance with the invention.

FIG. 3 is a diagram of another embodiment of a packet telephony distribution system in accordance with the invention. Similar to the embodiment shown in FIG. 2, gateway 120 is coupled to telephone network 110 and phones 260. However, in this embodiment, gateway 120 includes a telephony switch 335 and can dynamically control which phones 260 are connected to which outside phone lines in telephone network 110. Each phone 260 can establish a separate connection to gateway 120 and the connection to telephone network 110 can include any number of phone lines. Further, telephone network 110 need not use the same technology used by phones 260. For example, telephone network 110 can be analog phone lines or phone lines carried over cable TV wires, while phones 260 can use HomePNA.

Telephony switch 335 permits gateway 120 to control the operation of phones 260 via signaling protocols between gateway 120 and phones 260. Exemplary signaling protocols are MGCP and ITU-T H.248/Megaco. Functions of the signaling protocol include hook-state transitions, which determines whether phone 260 is on hook or off hook, and ring signaling. In this embodiment, the signaling protocols used between gateway 120 and phones 260 are independent of the signaling protocols used to connect gateway 120 to the outside phone lines in telephone network 110.

Figure 4:
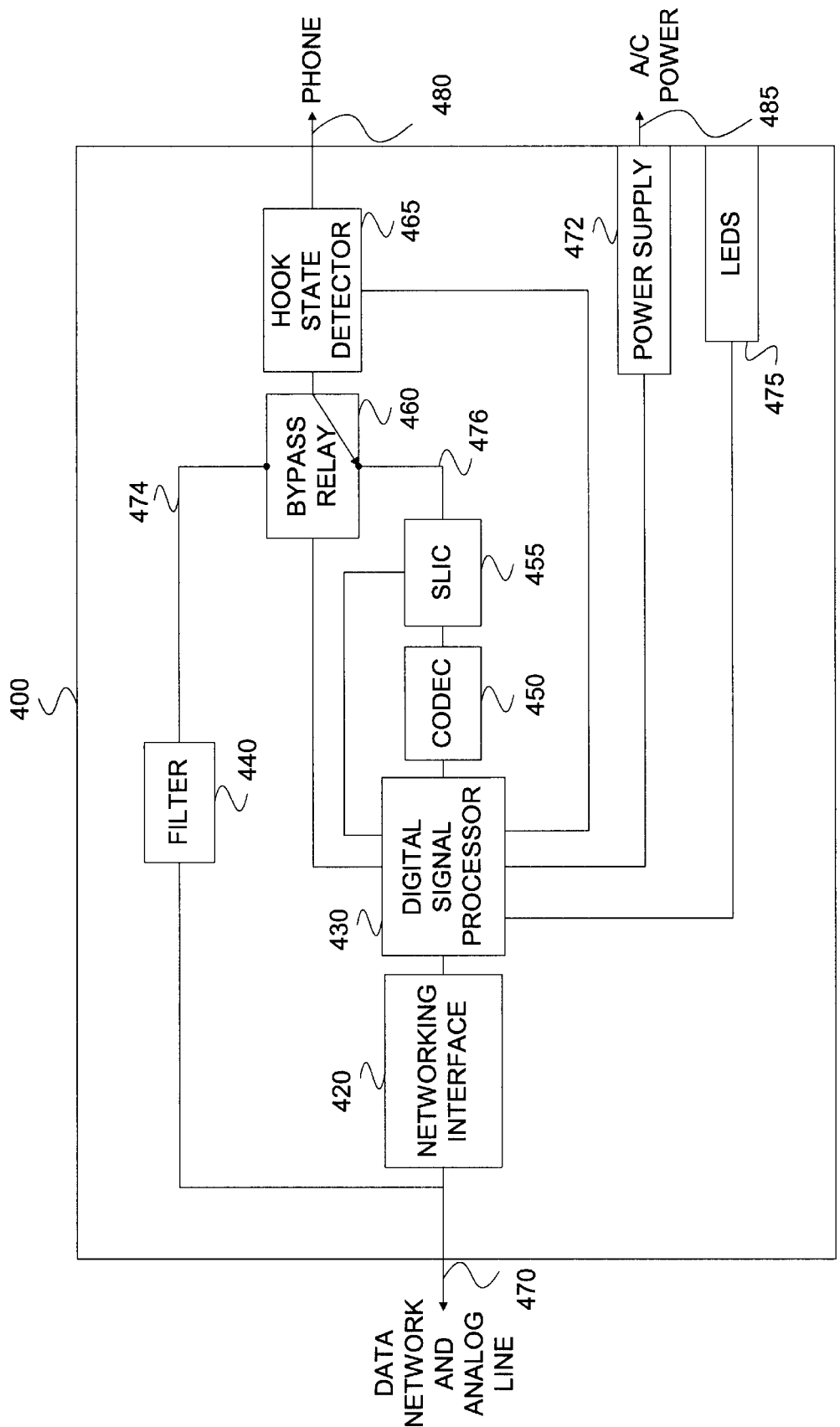
FIG. 4 is a diagram of an embodiment of a dual-use packet/analog phone adapter in accordance with the invention.

FIG. 4 is a diagram of an embodiment of a dual-use packet/analog phone adapter in accordance with the invention. In the FIG. 4 embodiment, an adapter 400 is implemented as phone adapter 130 (FIG. 1). In another embodiment, adapter 400 is implemented as part of network connected phone 150 (FIG. 1). Adapter 400 is shown with two communication paths. A first communication path 470 provides a path to a data network and analog line. A second communication path 480 provides a path to analog phone 140 (FIG. 1) or a similar communication device.

For communicating on first communication path 470, adapter 400 includes a component, such as a networking interface 420, to implement a protocol, such as HomePNA, to communicate digitized voice and call-control signaling. For communicating on second communication path 480, adapter 400 can emulate a connection to an analog phone line.

Adapter 400 includes a power supply 472 that is coupled to an A/C power supply (not shown) via a path 485.

Information is displayed via LEDs 475, which are controlled by a digital signal processor 430. Networking interface 420 is coupled to gateway 120 via first communication path 470 and is further coupled to digital signal processor 430. Digital signal processor 430 is also coupled to a codec 450, a SLIC (Subscriber Line Interface Circuit) 455, a bypass relay 460, and a hook state detector 465.

The primary functions of digital signal processor 430 are processing packet telephony signals and data. Digital signal processor 430 also controls SLIC 455 and bypass relay 460. Networking interface 420 functions according to the HomePNA, HomePlug, HomeRF, or other networking standard. Further, when the derived phone line and the analog phone line share the same copper wire-pair, such as HPNA, networking interface 420 can distinguish between data packets and analog signals. Codec 450 is further coupled to SLIC 455, which is coupled to bypass relay 460. Typically, codec 450 has the functionality of a standard off-the-shelf coder/decoder and SLIC 455 performs electrical signaling, such as monitoring voltage levels and ring generation.

Bypass relay 460 is coupled to a filter 440, which is coupled to gateway 120 via first communication path 470. Filter 440 is configured to pass only POTS band signals to a path 474.

Bypass relay 460 is configured to couple hook state detector 465 to path 474 or to a path 476 according to control signals from digital signal processor 430. Bypass relay is in a "bypass on" state when it couples hook state detector 465 with path 474. Bypass relay 460 couples hook state detector 465 to path 474 to allow the communication device coupled to path 480 to transmit and receive POTS signals to and from an analog phone line in telephone network 110 (FIG. 1). Bypass relay 460 is in a "bypass off" state when it couples hook state detector 465 with path 476. Bypass relay 460 couples hook state detector 465 to path 476 to allow the communication device to communicate with telephone network 110 using packet telephony signals and data. Other equivalent relay arrangements, such as adding multiple bypass relays 460, are possible to switch between the analog phone line and the packet telephony line.

Hook state detector 465 is configured to detect the hook state of the communication device coupled to second communication path 480. In this embodiment, hook state detector 465 measures a loop current in the connection to the communication device coupled to second communication path 480. If the loop current is flowing, then the communication device coupled to second communication path 480 is off hook. Other embodiments are possible that vary the components and component interconnections of adapter 400 without departing from the spirit of the invention. For example, an equivalent adapter 400 in network connected phone 150 includes similar components, with the exception of second communication path 480.

FIG. 5 is a diagram illustrating one embodiment of a gateway configuration. A gateway table 520 stored in gateway 120 (FIG. 1) is configured to associate each phone 260 (FIG. 2) with one or more data network and analog lines on telephone network 110 (FIG. 1), such that incoming calls on the data network and analog lines ring the appropriate phone 260. An exemplary configuration includes a unique phone name 530, a unique address 540, a caller ID 550, a time of day 560 identifier, a day of week 570 identifier, or other identifier 580. A variety of methods exist to configure the associations and rules that ring a particular phone 260. One configuration method can be via physical switches on gateway 120. Other configuration methods include using a web interface to gateway 120 or configuration control software. The web interface and configuration control software can operate on gateway 120 or on a computer (not shown) coupled to the packet telephony distribution system.

Operations such as incoming and outgoing calls use the associations stored in gateway table 520 to communicate any combination of voice, data, facsimile transmissions, or any other means of communication, from the data network and analog line to the communication device. In order to support the operations, a communication protocol between phones 260 and gateway 120 includes a method to communicate line-in-use indicators to phone 260.

In one embodiment, gateway 120 communicates the line-in-use indicator to and from phones 260 via message signals. Exemplary message signals are loop states. The loop states are a ringing state, a normal loop current state, a reverse loop current state, and an open loop current state. The four loop states indicate the digital equivalent of the analog states that exist on an analog phone line. The ringing state is typically an AC signal with a specified amplitude and frequency. In the United States, the normal loop current state indicates that the analog phone line is in a normal state by typically using 48V DC voltage. The reverse loop current state reverses the polarity of the DC voltage of the normal loop current state. The open loop current state disconnects any voltage from a PSTN central office, providing an open circuit condition. Typical phone networks only use the ringing state and the normal loop current state.

In a preferred embodiment, the loop states are extended to include a line-in-use state that is mutually exclusive of the other loop states and which emulates the characteristic of phone 260 extensions. The line-in-use state indicates to an on hook phone 260 that the loop state is equivalent to having one or more phone 260 extensions off hook. Typically, for an analog phone, the PSTN central office provides a normal loop current, resulting in a drop in voltage that is detectable by a first analog phone 140 (FIG. 1) if a second analog phone 140 is off hook. Therefore, the protocol for communicating the loop state can include the ringing state, the normal loop current state, the reverse loop current state, the open loop current state, and the line-in-use state. Another embodiment permits the line-in-use state to be independently communicated to phones 260, without the other loop states. For example, two states can include a line-in-use state and a line-not-in-use state.

In the preferred embodiment, adapter 400 can emulate line-in-use indicators. For example, in response to the line-in-use indicator from gateway 120, adapter 400 can reduce the line voltage to emulate a parallel-connected phone 260 having gone off hook. Adapter 400 can change the line voltage using several methods. One method uses SLIC 455, which can permit software control over the line voltage. Another method is to use a switch with a first resistor (not shown) in parallel with SLIC 455, emulating analog phone 140 being taken off hook. A second resistor (not shown) in series with a relay (not shown) or a FET (Field Effect Transistor) switch, both in parallel with SLIC 455, can be controlled by software in digital signal processor 430 in response to the line-in-use indicator, such that the switch is closed if the line is in use, and open otherwise.

Adapter 400 processes message signals. However, message signals can be lost in transit. Therefore, the communication protocol must also be reliable. Three methods to ensure reliability include message retransmission, message repetition, and reliable transport protocol. In message retransmission, a message receiver transmits a return message to acknowledge the receipt of each message. If a message sender does not receive an acknowledgement within a designated time-out period, the message sender retransmits the message. A sequence number, or other equivalent identifier, can be used to permit a message receiver to distinguish a new message from a retransmitted message.

In message repetition, a message sender periodically retransmits messages in the event that one of the messages is lost. Similar to message retransmission, a sequence number, or other equivalent identifier, can be used to permit the message receiver to distinguish a new message from a retransmitted one. However, in message repetition, the retransmission time period can vary. Finally, in reliable transport protocol, the message can be sent using a reliable network transport protocol, such as TCP (Transmission Control Protocol).

Figure 6:
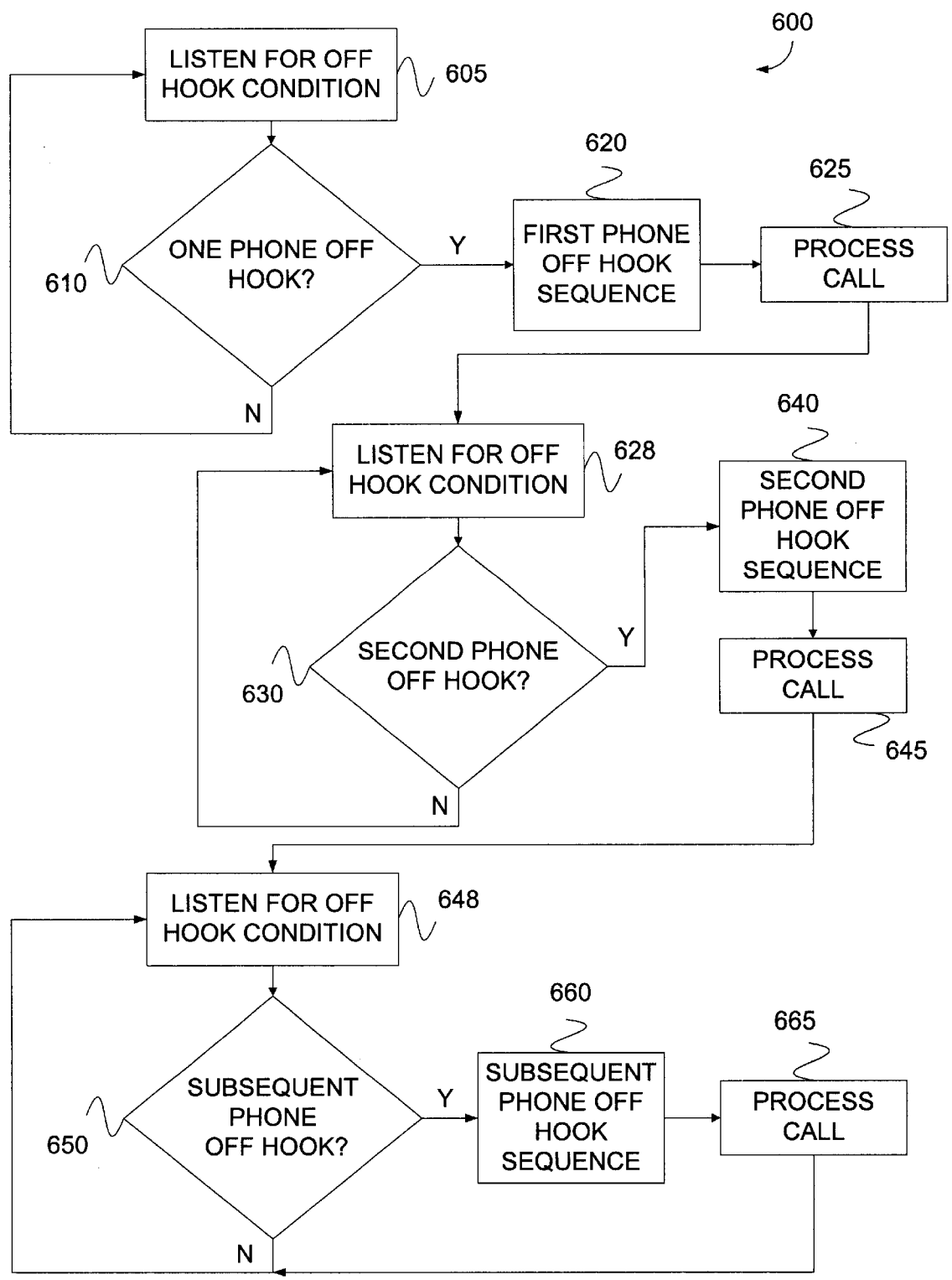
FIG. 6 is a flowchart of method steps for establishing an outgoing call in accordance with one embodiment of the invention.

FIG. 6 is a flowchart 600 of method steps for establishing an outgoing call in accordance with one embodiment of the invention. In step 605, gateway 120 listens for an off hook condition for a new outgoing call. Next, in step 610, if one phone 260 (FIG. 2) assigned to a line is taken off hook, then the first phone off hook sequence occurs in step 620. In step 620, the off hook condition is transmitted by phone 260 to gateway 120 (FIG. 1), using hook state detector 465 (FIG. 4). Next, gateway 120 sends a line-in-use indicator to all phones 260 assigned to that line indicating the line is in use. Adapter 400 (FIG. 4) uses the line-in-use indicator from gateway 120 to emulate a line-in-use electrical state in a signal it supplies to phone 260. Specifically, the emulation occurs when adapter 400 (FIG. 4), using SLIC 455 (FIG. 4), drops the voltage of the line. Then, phone 260 can use the line-in-use indicator to light a line-in-use indicator light or supply some other means of indication to the user.

In step 625, gateway 120 processes the outgoing call. Gateway 120 signals an outside phone line that the line assigned to phone 260 is off hook. Depending on the type of outside phone line, the signal can be a message to the packet telephony line or a voltage drop on the loop current to the analog phone line. Then, the outside phone line responds to the off hook signal by transmitting a dial tone. The dial tone can be an analog or digital audio tone or a message. If the dial tone is an audio tone, then gateway 120 establishes a bi-directional audio stream to and from phone 260, establishes a bi-directional audio stream to and from the outside phone line, and connects the two audio streams together, permitting the dial tone to pass to phone 260. If the dial tone is sent to gateway 120 as a message, then gateway 120 can either generate a tone to send to phone 260, or send a corresponding message to phone 260 indicating that it should generate the tone. If the dial tone is generated by gateway 120, then gateway 120 establishes an audio stream to phone 260 and transmits the dial tone to the phone 260. If the dial tone is generated by phone 260, then gateway 120 sends a message to phone 260 and phone 260 generates the dial tone to the user. In step 610, if no phone 260 is taken off hook, then there is no outgoing call and the method returns to step 605. In step 628, gateway 120 listens for an off hook condition on a second phone 260. Next, in step 630, if second phone 260 is taken off hook, then the second phone off hook sequence occurs in step 640. In step 640, second phone 260 transmits a signal to gateway 120 indicating that second phone 260 is off hook. Then, gateway 120 establishes a bi-directional audio stream to and from second phone 260.

In step 645, gateway 120 processes the outgoing call by mixing the outgoing audio stream from first phone 260 and second phone 260 to generate the outgoing audio stream that gateway 120 transmits to the outside phone line. Gateway 120 also mixes audio from the outside phone line with audio from second phone 260 and sends the mixed signal to first phone 260. The audio from first phone 260 is not mixed to avoid echo. Further, gateway 120 mixes audio from the outside phone line with the audio from first phone 260 to generate the audio stream that gateway 120 transmits to second phone 260. Therefore, the user at second phone 260 will hear the audio from first phone 260 in the outgoing call as well as the audio from the outside phone line. The audio from second phone 260 is not mixed to avoid echo.

In step 630, if the second phone 260 coupled to the same line is not taken off hook, then the method returns to step 628 and gateway 120 listens for an off hook condition for second phone 260. In step 648, gateway 120 listens for an off hook condition for a subsequent phone 260. However, in step 650, if the subsequent phone 260 mapped to the line is taken off hook, then the subsequent phone off hook sequence occurs in step 660. In step 660, subsequent phone 260 sends a signal to gateway 120 indicating that subsequent phone 260 is off hook. Then, gateway 120 establishes a bi-directional audio stream to and from subsequent phone 260.

In step 665, gateway 120 processes the outgoing call by mixing the outgoing audio stream from each subsequent phone 260 together to generate the outgoing audio stream that gateway 120 transmits to the outside phone line. To generate the audio stream sent to phones 260, gateway 120 mixes the audio from the outside phone line with the outgoing audio from all phones 260 in the call. The user at each phone 260 will hear the audio from the first phone 260 in the call as well as the audio from all of the other phones 260. The user of phone 260 does not have the audio from their own phone 260 mixed in to avoid unnecessary echo.

In step 650, if no subsequent phone 260 is taken off hook, then in step 648, gateway 120 listens for the subsequent phone 260 to go off hook. When all phones 260 in a call go on hook, the outgoing call ends and gateway 120 listens for one phone 260 to go off hook.

Figure 7:
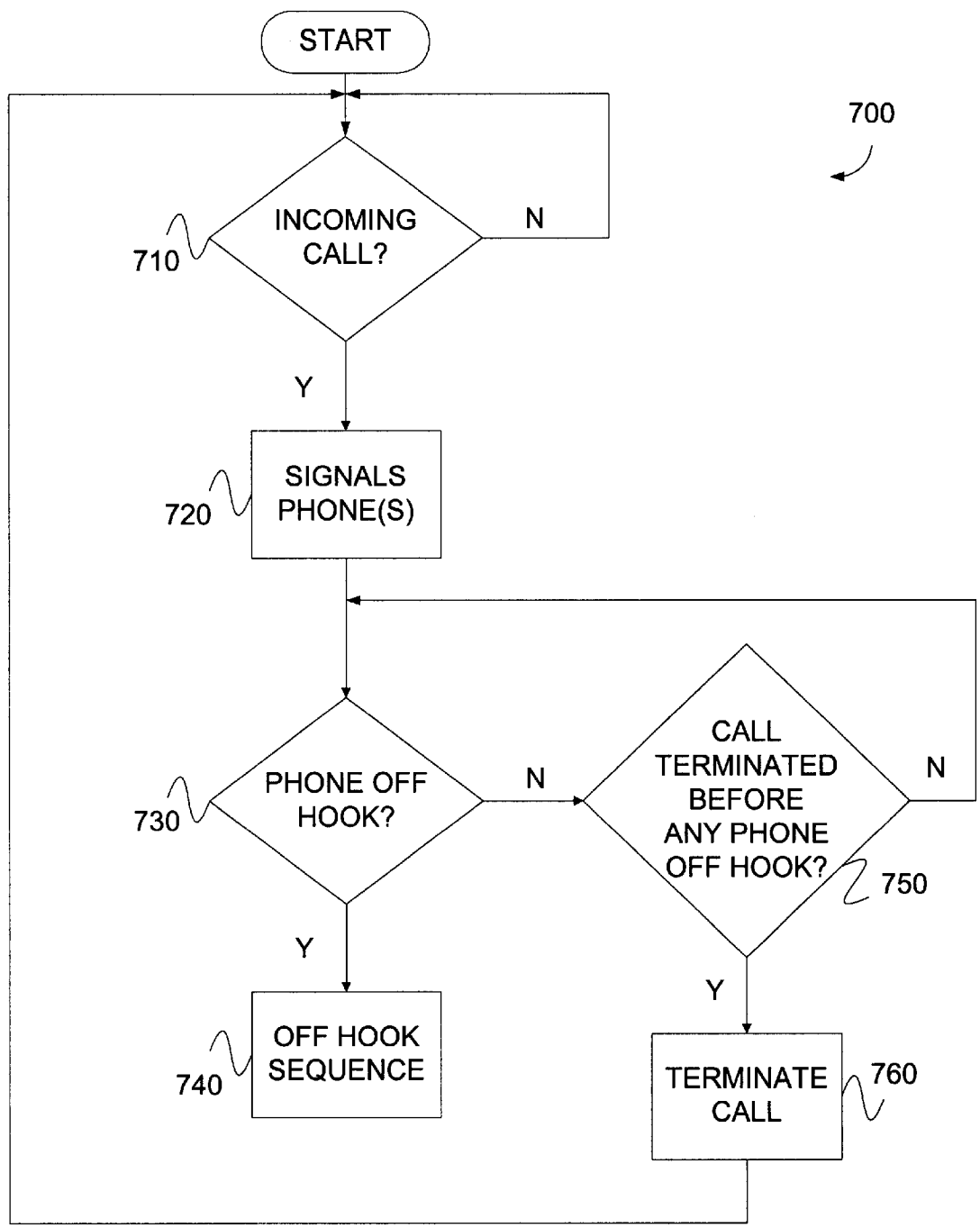
FIG. 7 is a flowchart of method steps for receiving incoming calls in accordance with one embodiment of the invention.

FIG. 7 is a flowchart 700 of method steps for receiving incoming calls in accordance with one embodiment of the invention. In step 710, if an incoming call arrives, then the outside phone line signals an incoming call to gateway 120 and proceeds to step 720. If there is no incoming call, then gateway 120 listens for an incoming call. During an incoming call, a packet telephony line transmits a message while an analog phone line transmits a ring signal. Typically, the ring signal is an AC voltage of a defined amplitude and frequency.

In step 720, gateway 120 signals phone 260 to ring. The signal can be an incoming call signal or a ring control signal. The incoming call signal indicates an incoming call condition when the incoming call signal is first received. Gateway 120 terminates the incoming call condition only if phone 260 answers the call or the incoming call terminates. Further, phone 260 determines the ring cadence for the incoming call condition. Alternatively, the ring control signal indicates when phone 260 ringer should be on or off. The ring control signal causes gateway 120 to generate a sequence of ringer on and off signals to phone 260, resulting in a specific ring cadence. The ring cadence may or may not match a ring cadence signaled by the outside phone line.

Next, in step 730, if any phone 260 is taken off hook, phone 260 signals gateway 120 that it is off hook, and the off hook sequence in step 740 occurs. In step 740, gateway 120 terminates the incoming call or ring signaling to all phones 260 mapped to the line by indicating the no-incoming-call or ringer-off condition. Next, gateway 120 signals all phones 260 mapped to the line that the line is in use and further signals the outside phone line that phone 260 has been taken off hook. Gateway 120 next establishes a bi-directional audio stream to and from the off hook phone 260, establishes a bi-directional audio stream to and from the outside phone line, and connects the two audio streams together, permitting the audio stream from the outside phone line to pass to phone 260, and vice versa.

Subsequent phones 260 can go off hook to join the incoming call. Gateway 120 mixes the audio stream from each subsequent phone 260 together to generate the outgoing audio stream that gateway 120 transmits to the outside phone line. To generate the audio stream sent to phones 260, gateway 120 mixes the audio from the outside phone line with the outgoing audio from all phones 260 in the call. The user at each phone 260 will hear the audio from the first phone 260 in the call as well as the audio from all of the other phones 260. The user of phone 260 does not have the audio from their own phone 260 mixed in to avoid unnecessary echo.

If no phone 260 is taken off hook, then in step 750, if the incoming call terminates before any phone 260 has gone off hook, gateway 120 terminates the incoming call in step 760. In step 760, gateway 120 terminates ring signaling to all phones 260 mapped to the line by indicating a no-incoming-call, or ringer-off condition. Subsequently, gateway 120 listens for an incoming call. However, if the incoming call does not terminate before any phone 260 is taken off hook, then the gateway continues to signal phones 260.

For both incoming calls and outgoing calls, an on hook sequence occurs. When any phone 260 goes on hook, phone 260 signals gateway 120 that it is on hook. Then, gateway 120 determines if one or more phones 260 mapped to the same outside phone line remain off hook. If one or more phones 260 remain off hook, then gateway 120 terminates the bi-directional audio stream to and from the one phone 260 that had just gone on hook and stops mixing the audio stream into the outgoing audio stream. Further, gateway 120 also stops mixing the audio stream from the one phone 260 that had just gone on hook into the audio streams sent from gateway 120 to any other off hook phones 260. If there are no more phones 260 remaining in the call, then gateway 120 terminates the bi-directional audio stream to and from the last phone 260 that had just gone on hook and signals all phones 260 mapped to the line that the line is no longer in use. Further, gateway 120 terminates the bi-directional audio stream to and from the outside phone line and signals the outside phone line that the line is now on hook. Depending on the type of outside phone line, gateway 120 can transmit a message in the packet telephony line or by opening a loop connection, which blocks the loop current to the line in the analog phone line.

The invention has been explained above with reference to specific embodiments. Other embodiments will be apparent to those skilled in the art in light of this disclosure. The present invention may readily be implemented using configurations other than those described in the embodiments above. Additionally, the present invention may effectively be used in conjunction with systems other than the one described above. Therefore, these and other variations upon the above embodiments are intended to be covered by the present invention, which is limited only by the appended claims.

What is claimed is:

1. A system for emulating phone extensions in a packet telephony distribution system comprising:

a gateway coupled to a telephone network, the gateway configured to dynamically control communication between a plurality of communication devices and a plurality of data network and analog lines in the telephone network, wherein the gateway is further configured to transmit dial tones and line-in-use indicators to the plurality of communication devices; and a plurality of adapters coupled to the plurality of communication devices, the plurality of adapters being configured to receive incoming calls via the plurality of data network and analog lines and to selectively make outgoing calls via the plurality of data network and analog lines; and a first adapter having a networking interface and a processor, wherein the networking interface is configured to operate according to a networking standard and the processor couples to the networking interface.

2. The system of claim 1, wherein the gateway mixes audio streams from the plurality of data network and analog lines and the plurality of communication devices.

3. The system of claim 1, wherein the gateway includes a network device for dynamic control of communication between the plurality of communication devices and the plurality of data network and analog lines.

4. The system of claim 1, wherein one of each of the plurality of communication devices is uniquely coupled to one of each of the plurality of adapters.

5. The system of claim 4, wherein each of the plurality of adapters is coupled to an analog phone line and a derived phone line for receiving incoming calls and transmitting outgoing calls.

6. The system of claim 1, wherein
the processor comprises
a digital signal processor configured to process telephony signals and streaming audio; and the first adapter further includes a codec coupled to the digital signal processor;

a SLIC coupled to the codec and further coupled to the digital signal processor, the SLIC being configured to send signals on the data network and analog lines to control a line voltage for emulating a plurality of line-in-use indicators;

a bypass relay coupled to the SLIC and the digital signal processor wherein the bypass relay dynamically switches access between a derived line and an analog line; and a hook state detector coupled to the communication device and the digital signal processor for detecting a loop current and detecting an off hook condition and an on hook condition.

7. The system of claim 6, wherein the gateway generates a dial tone in response to an incoming call signal and sends the dial tone to an appropriate one of the plurality of communication devices.

8. The system of claim 6, wherein the one of the plurality of adapters generates a dial tone in response to a signal from the gateway to send the dial tone to an appropriate one of the plurality of communication devices.

9. The system of claim 6, wherein the gateway communicates a message signal to the one of the plurality of adapters.

10. The system of claim 9, wherein the message signal is a ringing state, a normal loop current state, a reverse loop current state, an open loop current, or a line-in-use state.

11. A method for emulating phone extensions in a packet telephony distribution system, comprising the steps of:

configuring a gateway to identify a plurality of communication devices;

receiving an incoming call signal from a data network and analog line at the gateway;

transmitting a dial tone to the plurality of communication devices using the gateway;

transmitting a line-in-use indicator to the plurality of communication devices using the gateway; and mixing audio streams but not mixing audio from a first communication device to avoid echoes at the first communication device.

12. The method of claim 11, further comprising the step of determining an off hook and an on hook condition of the plurality of communication devices.

13. The method of claim 11, further comprising the step of performing multiple off hook sequences for establishing communication between the plurality of communication devices and the gateway.

14. The method of claim 11, further comprising the step of changing voltage levels between the gateway and the plurality of adapters to indicate an off hook condition.

15. The method of claim 11, further comprising the step of mixing audio streams from the plurality of communication devices for transmission to a data network and analog line.

16. The method of claim 11, further comprising the step of transmitting and receiving a data message and an analog signal on the data network and analog line.

17. A system for emulating phone extensions in a packet telephony distribution system, comprising:

means for identifying a plurality of communication devices;

means for receiving an incoming call signal from a data network and analog line at the gateway;

means for transmitting a dial tone to the plurality of communication devices using the gateway;

means for transmitting a line-in-use indicator to the plurality of communication devices using the gateway; and means for mixing audio streams but not mixing audio from a first communication device to avoid echoes at the first communication device.

18. A method for emulating phone extensions in a packet telephony distribution system, comprising:

configuring a gateway to identify a plurality of communication devices;

receiving an incoming call signal from a data network and analog line at the gateway;

transmitting a dial tone to the plurality of communication devices using the gateway;

transmitting a line-in-use indicator to the plurality of communication devices using the gateway; and performing multiple off hook sequences for establishing communication between the plurality of communication devices and the gateway.

19. A system for emulating phone extensions in a packet telephony distribution system, comprising:

means for configuring a gateway to identify a plurality of communication devices;

means for receiving an incoming call signal from a data network and analog line at the gateway;

means for transmitting a dial tone to the plurality of communication devices using the gateway;

means for transmitting a line-in-use indicator to the plurality of communication devices using the gateway; and means for performing multiple off hook sequences for establishing communication between the plurality of communication devices and the gateway.

* * * * *